United States Patent
Savalle et al.

(10) Patent No.: US 10,601,676 B2
(45) Date of Patent: Mar. 24, 2020

(54) CROSS-ORGANIZATIONAL NETWORK DIAGNOSTICS WITH PRIVACY AWARENESS

(71) Applicant: Cisco Technology, Inc., San Jose, CA (US)

(72) Inventors: Pierre-André Savalle, Rueil-Malmaison (FR); Grégory Mermoud, Veyras (CH); Jean-Philippe Vasseur, Saint Martin D'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 194 days.

(21) Appl. No.: 15/705,462

(22) Filed: Sep. 15, 2017

(65) Prior Publication Data
US 2019/0089599 A1    Mar. 21, 2019

(51) Int. Cl.
*H04L 12/24* (2006.01)
*H04W 12/02* (2009.01)
*H04L 29/06* (2006.01)
*H04L 29/08* (2006.01)

(52) U.S. Cl.
CPC .......... *H04L 41/22* (2013.01); *H04L 41/5025* (2013.01); *H04L 63/0421* (2013.01); *H04L 67/303* (2013.01); *H04L 67/34* (2013.01); *H04L 67/36* (2013.01); *H04W 12/02* (2013.01); *H04L 41/142* (2013.01); *H04L 41/16* (2013.01)

(58) Field of Classification Search
CPC ....... H04L 41/142; H04L 41/16; H04L 41/22; H04L 41/5025; H04L 67/303; H04L 67/36
See application file for complete search history.

(56) References Cited

U.S. PATENT DOCUMENTS

| 7,509,415 | B2 | 3/2009 | Baekelmans et al. |
| 8,055,739 | B2 | 11/2011 | Branca et al. |
| 8,996,659 | B2 | 3/2015 | Werth et al. |
| 9,418,088 | B1* | 8/2016 | Noll ................ H04L 67/1097 |
| 9,460,390 | B1* | 10/2016 | Lin .......................... G06N 5/04 |
| 2009/0265784 | A1* | 10/2009 | Waizumi ............ H04L 63/1458 726/23 |
| 2009/0323516 | A1 | 12/2009 | Bhagwan et al. |
| 2011/0275364 | A1* | 11/2011 | Austin .................... H04L 41/06 455/423 |

(Continued)

*Primary Examiner* — Mohamed A. Wasel
(74) *Attorney, Agent, or Firm* — Behmke Innovation Group LLC; James Behmke; Stephen D. LeBarron

(57) ABSTRACT

In one embodiment, a service identifies a performance issue exhibited by a first device in a first network. The service forms a set of one or more time series of one or more characteristics of the first device associated with the identified performance issue. The service generates a mapping between the set of one or more time series of one or more characteristics of the first device to one or more time series of one or more characteristics of a second device in a second network. The mapping comprises a relevancy score that quantifies a degree of similarity between the characteristics of the first and second devices. The service determines a likelihood of the second device exhibiting the performance issue based on the generated mapping and on the relevancy score. The service provides an indication of the determined likelihood to a user interface associated with the second network.

20 Claims, 8 Drawing Sheets

(56) References Cited

U.S. PATENT DOCUMENTS

| | | | |
|---|---|---|---|
| 2015/0158511 A1* | 6/2015 | Fries | B61L 5/06 |
| | | | 324/511 |
| 2016/0259869 A1* | 9/2016 | Parikh | G06F 17/5009 |
| 2017/0019291 A1* | 1/2017 | Tapia | G06N 20/00 |
| 2017/0054601 A1 | 2/2017 | Affoneh et al. | |
| 2017/0277582 A1* | 9/2017 | Chen | G06F 11/079 |
| 2018/0034685 A1* | 2/2018 | Naous | H04L 41/22 |

\* cited by examiner

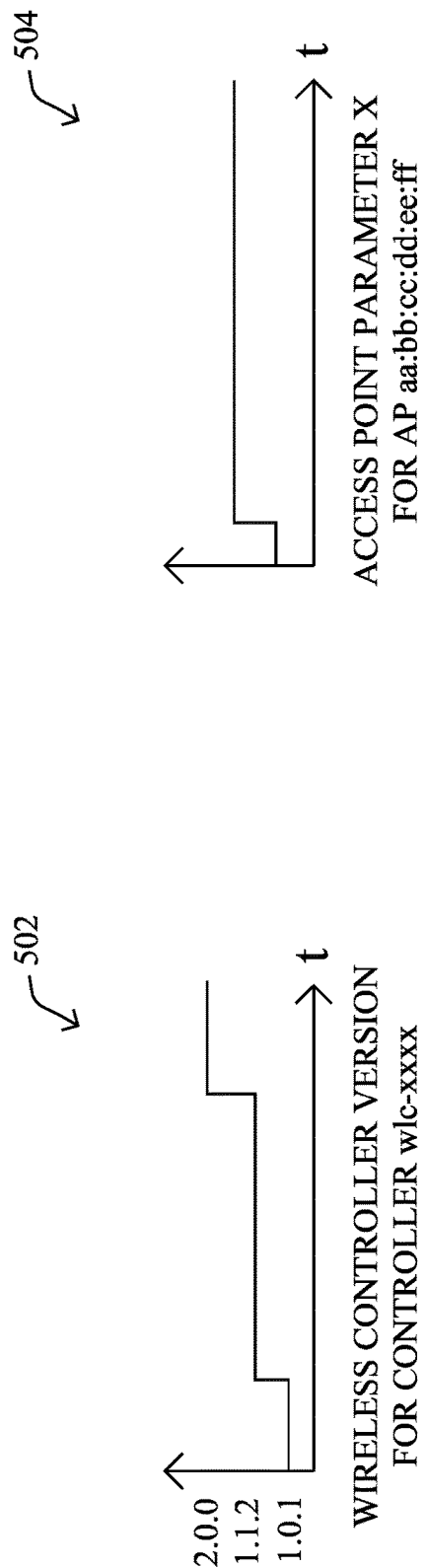
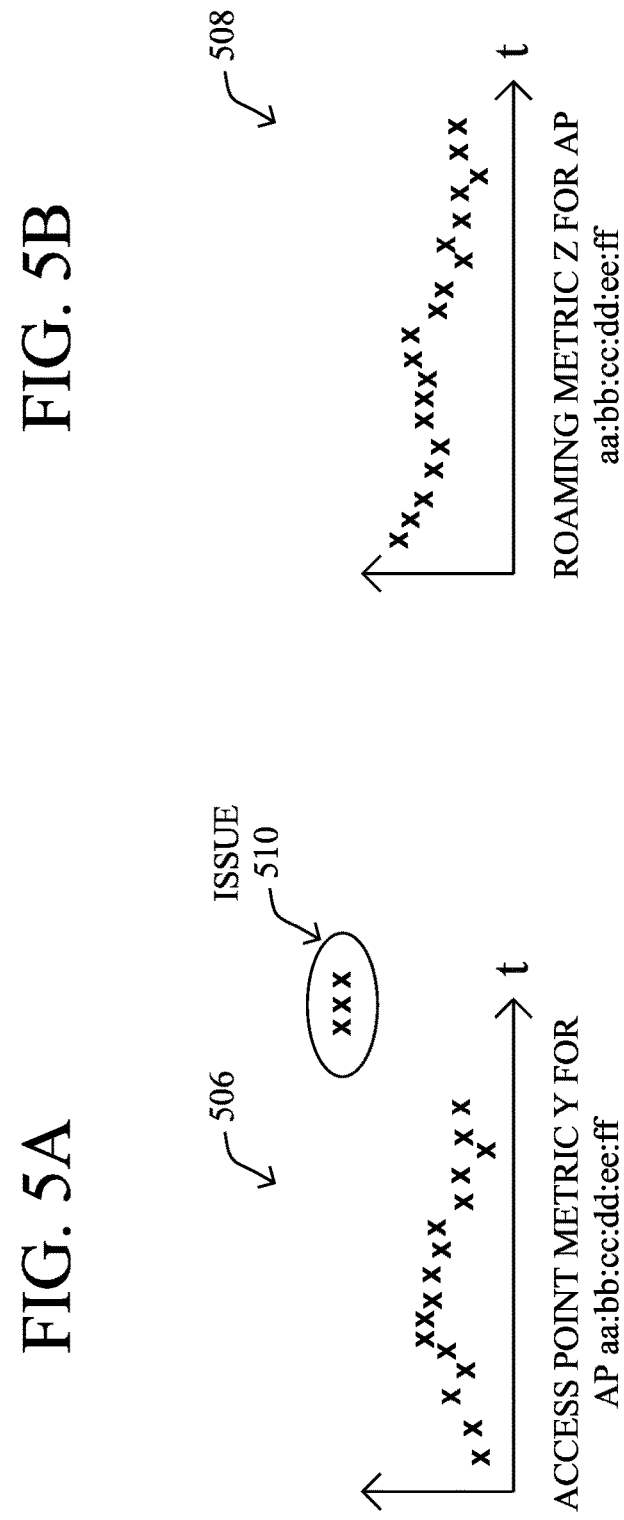

CROSS-ORGANIZATIONAL NETWORK DIAGNOSTICS WITH PRIVACY AWARENESS

TECHNICAL FIELD

The present disclosure relates generally to computer networks, and, more particularly, to cross-organizational network diagnostics with privacy awareness.

BACKGROUND

Many network assurance systems rely on predefined rules to determine the health of the network. In turn, these rules can be used to trigger corrective measures and/or notify a network administrator as to the health of the network. For instance, in an assurance system for a wireless network, one rule may comprise a defined threshold for what is considered as an acceptable number of clients per access point (AP) or the channel interference, itself. More complex rules may also be created to capture conditions over time, such as a number of events in a given time window or rates of variation of metrics (e.g., the client count, channel utilization, etc.). With more advanced analytics, it may even be possible to implement such an assurance system as a remote or cloud-based service.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5D illustrate example time series of device characteristics;

DESCRIPTION OF EXAMPLE EMBODIMENTS

Overview

Figure 1A:
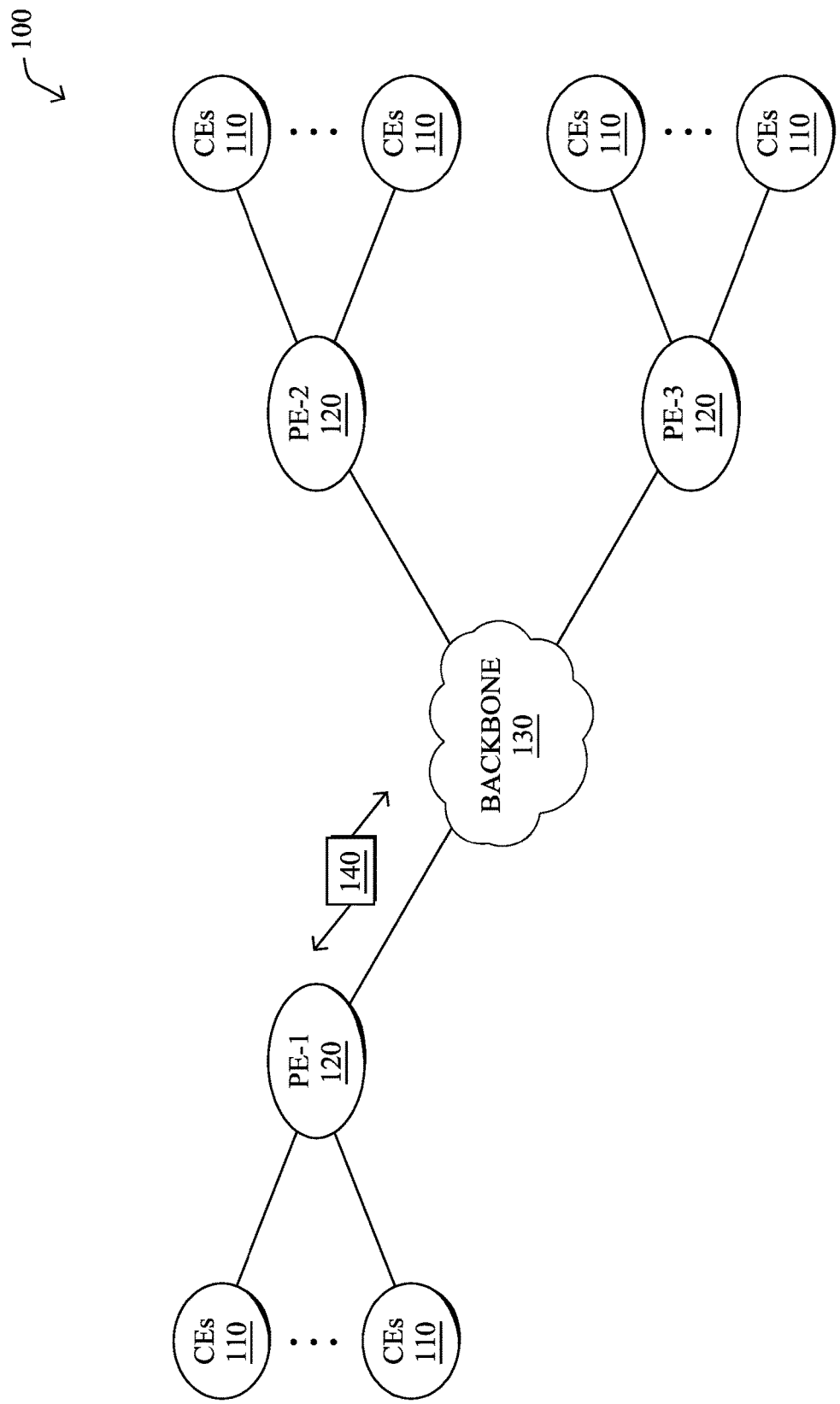
FIGS. 1A-1B illustrate an example communication network.

According to one or more embodiments of the disclosure, a service identifies a performance issue exhibited by a first device in a first network. The service forms a set of one or more time series of one or more characteristics of the first device associated with the identified performance issue. The service generates a mapping between the set of one or more time series of one or more characteristics of the first device to one or more time series of one or more characteristics of a second device in a second network. The mapping comprises a relevancy score that quantifies a degree of similarity between the characteristics of the first and second devices. The service determines a likelihood of the second device exhibiting the performance issue based on the generated mapping and on the relevancy score. The service provides an indication of the determined likelihood to a user interface associated with the second network.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement (SLA) characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed SLA, whereas Internet links may either have no SLA at all or a loose SLA (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
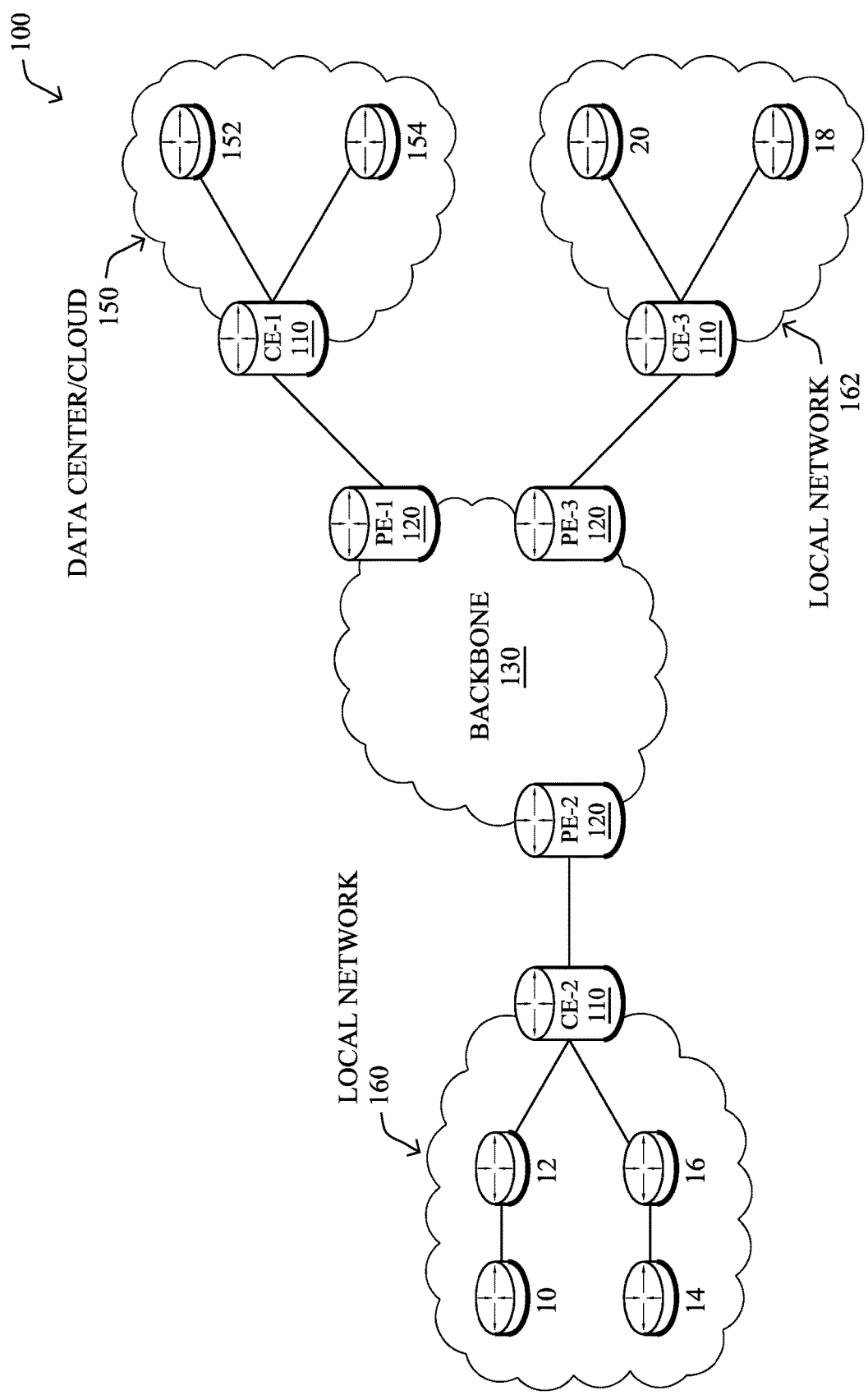

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
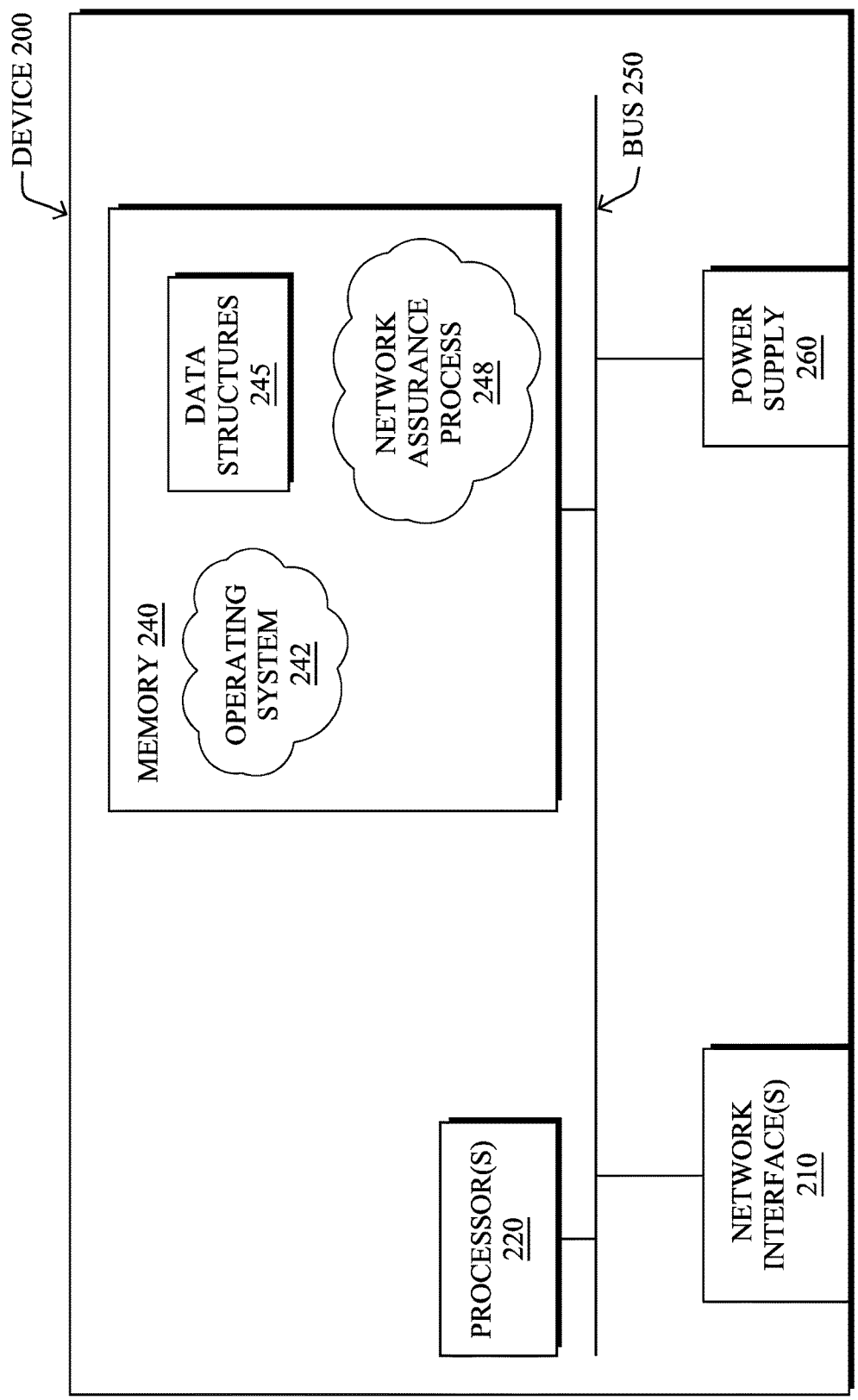
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
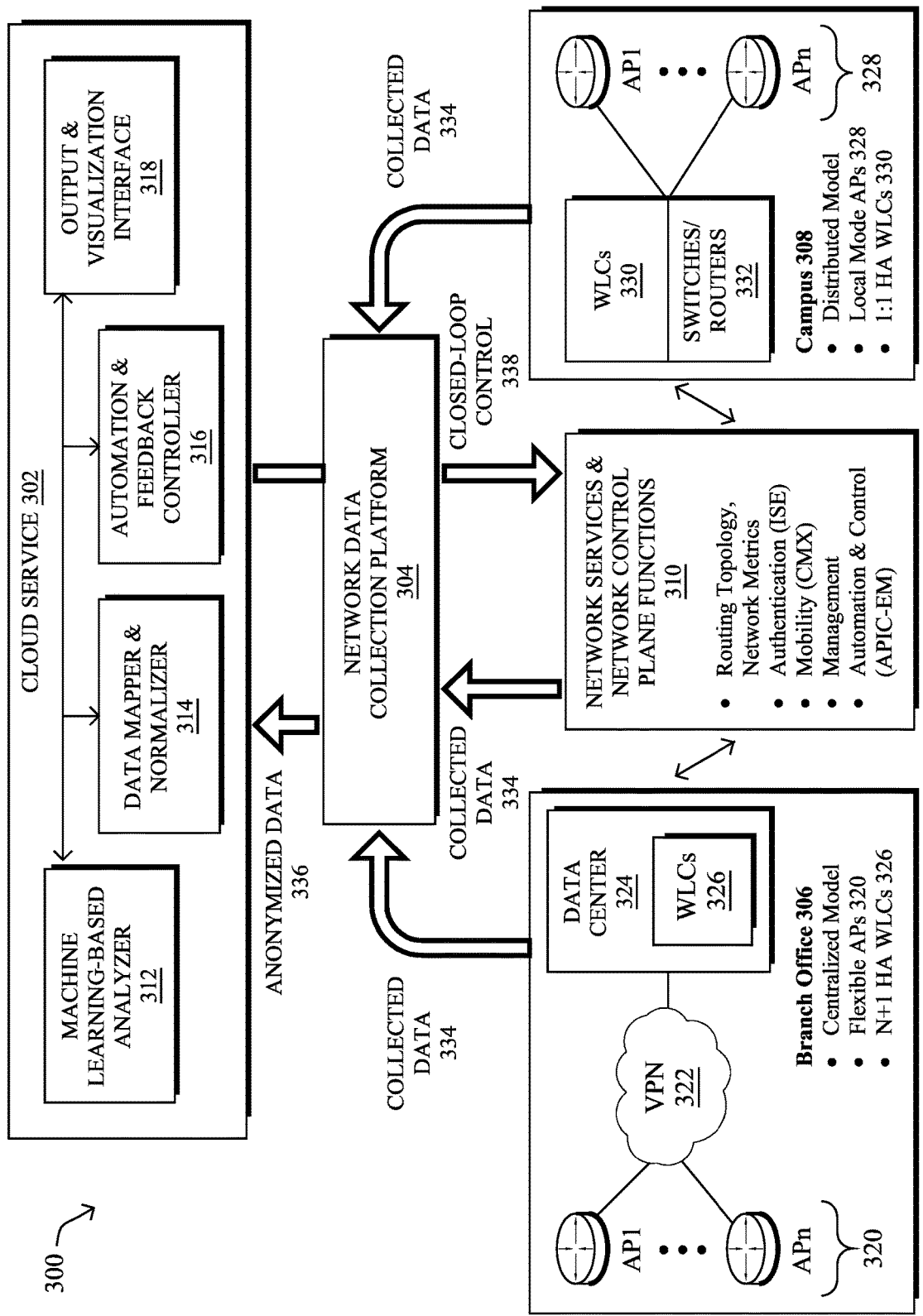
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an organization (e.g., a company, school, etc.) that includes any number of local networks. For example, cloud service 302 may oversee the operations of the local networks of any number of branch offices (e.g., branch office 306) and/or campuses (e.g., campus 308) that may be associated with the organization. Data collection from the various local networks/locations may be performed by a network data collection platform 304 that communicates with both cloud service 302 and the monitored network of the organization.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint device, networking device in branch office 306 or campus 308, or a network service or control plane function 310, to adjust its operations (e.g., by signaling an endpoint to use a particular AP 320 or 328, etc.).

As noted above, wireless networks are complex infrastructures that may include a large number of different network entities/elements/devices, such as wireless controllers, access points (APs), or clients. Monitoring such networks, e.g., via network assurance system 300, may require the system to assess a large number of time series that correspond to any or all of the characteristics (e.g., metrics, settings, configurations, counters, etc.) of each of the network entities. Further, as in the case of cloud-based or remote-based monitoring, the network assurance system may have access to characteristic data for devices located in any number of different networks maintained by any number of different organizations (e.g., schools, businesses, government agencies, etc.). Machine learning and artificial intelligence built into the assurance system (e.g., analyzer 312) can take advantage of this large pool of data to infer dependencies between entities, produce forecasting models, detect anomalies, and/or perform other functions.

Oftentimes, an issue affecting the network of one organization may affect the network of another organization, in the short to distant future. For example, an administrator in one organization may upgrade some software on a device without realizing that the resulting combination of software now installed on the device does not work well together. Similarly, operating system (OS) or device manufacturers often release upgrades without the control of the network administrator, which could degrade performance due to bugs or compatibility issues. Finally, some network configurations can prove suboptimal or lead to issues, such as oscillations with AP associations or bad roaming patterns. All of those "pre-existing conditions" can go un-noticed until the corresponding instabilities turn into an actual outage.

Cross-Organizational Network Diagnostics with Privacy Awareness

The techniques herein allow a network assurance system to anticipate performance issues that a device may experience using cross-organizational network diagnostics and in a privacy-aware manner. In some aspects, the system may generate one or more time series of characteristics of a network entity experiencing a performance issue, before and/or around the time the entity experienced the performance issue. In turn, the system may construct feature vectors from the available information and look for similar conditions in the networks of other organizations, to detect when similar performance issues may arise. Privacy-preserving mechanisms are also introduced herein, to ensure that information about the source network are not leaked to the other organizations that also use the network assurance system.

Specifically, according to one or more embodiments of the disclosure as described in detail below, a service identifies a performance issue exhibited by a first device in a first network. The service forms a set of one or more time series of one or more characteristics of the first device associated with the identified performance issue. The service generates a mapping between the set of one or more time series of one or more characteristics of the first device to one or more time series of one or more characteristics of a second device in a second network. The mapping comprises a relevancy score that quantifies a degree of similarity between the characteristics of the first and second devices. The service determines a likelihood of the second device exhibiting the performance issue based on the generated mapping and on the relevancy score. The service provides an indication of the determined likelihood to a user interface associated with the second network.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
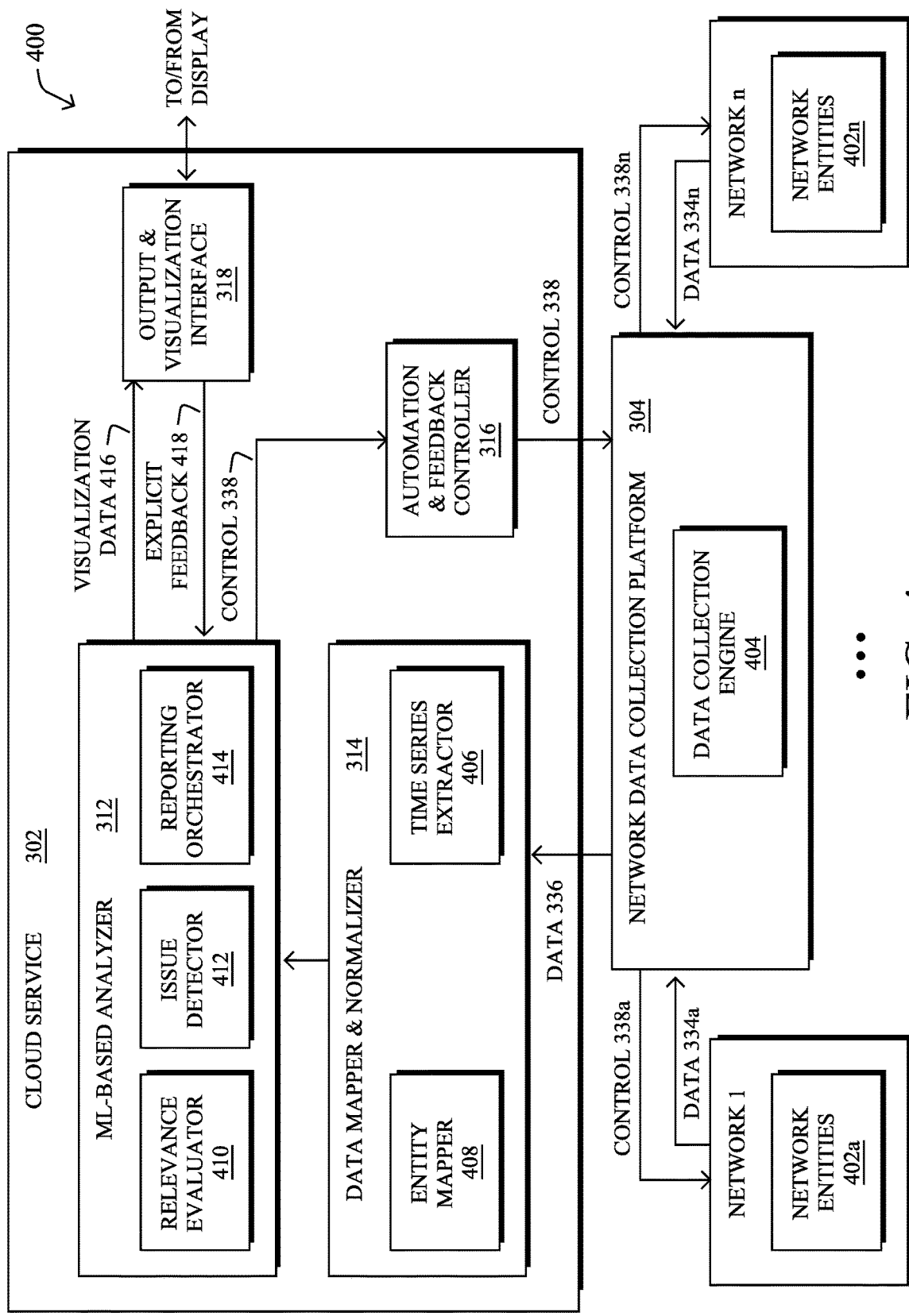
FIG. 4 illustrates an example architecture for cross-organizational diagnostics in a network assurance system.

Operationally, FIG. 4 illustrates an example architecture 400 for cross-organizational diagnostics in a network assurance system, according to various embodiments. In some implementations, the components of architecture 400 may be implemented within a network assurance system, such as system 300 shown in FIG. 3. Accordingly, the components of architecture 400 shown may be implemented as part of cloud service 302, as part of network data collection platform 304, and/or on network element/data source 402 itself. Further, these components may be implemented in a distributed manner or implemented as its own stand-alone service, either as part of the local network under observation or as a remote service. In addition, the functionalities of the components of architecture 400 may be combined, omitted, or implemented as part of other processes, as desired.

As shown and continuing the example of FIG. 3, a network assurance system may rely on data collection and reporting by any number of network entities/data sources 402 (e.g., devices) deployed across any number of networks associated with any number of different organizations. Notably, a first network associated with a first organization may include network entities 402a, etc., up to the network of the $n^{th}$ organization monitored by the assurance system, which includes network entities 402n. For example, a given network entity 402 may be a router, switch, access point, wireless controller (e.g., WLC, etc.), endpoint client device, or any other device located in the local network.

As discussed above, networking equipment in the local network may be configured to collect and report collected data 334 regarding the monitored network entities 402 to a data collection engine 404 in network data collection platform 304. In turn, the data collection engine 404 may provide the collected data (e.g., collected data 334, such as collected data 334a from network entities 402a, etc.) anonymized data 336 to data mapper and normalizer 314 in cloud service 302. For example, the data may be anonymized by altering or removing IP address information, geolocation information, metadata, or any other information in collected data 334 that can be used to instantly identify the organization associated with the local network. As would be appreciated, the anonymization of collected data 334 by data collection engine 404 may be optional, in some embodiments.

Data mapper and normalizer 314 of cloud service 302 may receive the reported data 336 from network data collection platform 304. Note that while a single data collection platform 304 is shown, further implementations may distribute data collection platform 304 across the various networks/organizations being monitored by cloud service 302. Example data 336 may include various captured metrics from the network that range from wireless or wired network events (e.g. joining, (fast/slow) roaming times), to network performance metrics (e.g., measured throughput collected via SNMP or JSON files), to the results of active network probing related to delays associated with key servers in the monitored network or on the Internet (e.g., Cisco WebEx servers, Google cloud, Microsoft Office 365 cloud, Skype cloud, etc.). Other known network metrics can also be captured, as desired. Other examples of data 336 reported to data mapper and normalizer 314 may include configuration information regarding network entities 402 such as hardware information (e.g., make, model, manufacturer, version, etc.), software information (e.g., OS version, installed applications, etc.), network topology information (e.g., the specific wireless controller that supervises an AP, etc.), or the like. Said differently, data 336 may include data indicative of characteristics of the various network entities 402 that may be present in the networks monitored by the network assurance system.

In various embodiments, data mapper and normalizer 314 may include a time series extractor 406 that is configured to generate time series of one or more characteristics of a given network entity/device 402. Such time series may, effectively, be captured input signals that describe the configuration, performance metrics, or other characteristics of the network entities 402 at different points in time. Time series of more dynamic metrics/characteristics, such as all available counters on wireless and wired equipment, is also possible. In the case of wireless, this may include time series about radio properties of the APs or the clients themselves, and/or network traffic breakdowns by application, software versions for the controller, the client devices, or the like. Further time series may relate to other devices and servers that may be present in the local network, such as authentication or accounting servers, etc.

Referring briefly to FIGS. 5A-5D, example time series are shown that may be generated by time series extractor 406. In particular, each characteristic of an entity/device in a network can be tracked over time by time series extractor 406 and used to form a time series. Note that in certain cases, the time series may be multi-dimensional, such as in the case of multiple characteristics being tracked by a given time series at once.

As shown in FIG. 5A, time series 502 may track the OS version of a particular wireless controller, wlc-xxxx, over the course of time. For example, each time the OS of the wireless controller is updated (e.g., from version 1.0.1 to version 1.1.2, from version 1.1.2 to version 2.0.0, etc.), time series 502 may change at the corresponding time at which the update occurred.

In FIG. 5B, another example time series 504 may track a given access point parameter X for a particular AP, aa:bb:cc:dd:ee:ff (e.g., a MAC address or other unique device identifier), over the course of time. Such a parameter may be, e.g., the maximum number of clients that may be associated with the AP, an antenna strength of the AP, or any other parameter that may be changed over time.

In FIG. 5C, a further example time series 506 may track a given metric Y for the AP of FIG. 5B, aa:bb:cc:dd:ee:ff. Similar to time series 504, which may track one or more configurations of the AP, time series 506 may track a performance metric associated with the AP, such as the available or used bandwidth, delays, jitter, packet loss, or any other performance metric measurable regarding the particular AP. Note that an issue 510 may be identifiable from time series 506, such as an unexpected change in the metric Y over time.

In FIG. 5D, another example time series 508 for AP, aa:bb:cc:dd:ee:ff, is shown, that tracks the roaming metric Z for the AP. For example, roaming metric Z may quantify the number of clients that have migrated/roamed away from the AP at any given time.

Referring again to FIG. 4, cloud service 302 may include issue detector 412 that is configured to detect performance issues exhibited by a monitored entity/device, based on the data from data mapper and normalizer 314. For example, issue detector 412 may identify issue 510 shown in FIG. 5C through an analysis of time series 506. Note that the scope of issues considered by issue detector 412 can be very large and can include anything from small transient issues, to catastrophic episodic events, to recurring issues.

Issue detector 412 can detect performance issues in a number of different ways. In one embodiment, issue detector 412 may automatically detect issues by using machine learning-based anomaly detection on the time series from time series extractor 406. Generally, anomaly detectors are able to identify behavioral changes that deviate from previously seen behavior. For example, as in the case of time series 506 shown in FIG. 5C, issue detector 412 can apply anomaly detection to time series 506, to detect the sudden change in the metric Y of the AP as a performance issue 510. Notably, given the time series from time series extractor 406, the anomaly detector may output a list of tuples of time series identifiers, entities/devices, and time intervals that are considered anomalous and can be flagged as issues. Thus, in some cases, issue detector 412 may detect issues in real-time, as they arise. In further embodiments, issue detector 412 may apply its mechanisms retrospectively to extract issues on historical data, such as when a new anomaly detection model is available. Issue detector 412 can even be applied periodically as the anomaly detection models improve.

In further embodiments, issue detector 412 may identify a performance issue based on explicit feedback 418 received from an administrator from one of the organizations, a domain expert that monitors data across multiple organizations, or the like. Notably, analyzer 312 may provide visualization data 416 to output and visualization interface 318 for presentation to a display or other user interface. This visualization data 416 may include, for example, information regarding the monitored network(s), such as time series from time series extractor 406 and/or other information derived from data 336 collected from the network(s). In turn, the user of the interface may provide back explicit feedback 418 to flag when issues exist. Issue detector 412 can then use explicit feedback 418 to output the appropriate information to identify the issue in cloud service 302, such as the tuple of time series identifiers, entities/devices, and time intervals associated with the issue.

For any given issue, issue detector 412 may also extract severity and/or privacy indicators for the issue, in some embodiments. In general, the severity indicators may reflect the degree of impact the detected issue had on the organization (e.g., how damaging or costly the issue was). For example, issue detector 412 may use machine learning models, domain-specific heuristics, and/or explicit feedback 418 (e.g., if the user of interface 318 also specifies the severity), to quantify the severity of the issue. A mix of these approaches can also be used, to minimize the amount of manual judgment required.

Generally, privacy indicators indicate how sensitive the issue is and characterize the extent to which revealing information about the detected issue could constitute an information leak for the organization at which the issue occurred (e.g., due to side-information attacks). For instance, knowledge that a given organization has experienced a black out of a certain type in a given area and a certain time might be public information. However, replaying part of this black out for other organizations that also use cloud service 302 may leak information on the original organization, such as the fact that the organization uses cloud service 302 in the first place, or specifics about what happened, from a networking perspective.

The other components of cloud service 302, described below, can leverage the privacy indicators by introducing variations (e.g., replay on a site of a different size, etc.), or by withholding the issue for replay for a random amount of time, to make correlation attacks more difficult. Although these countermeasures could, in principle, be applied systematically to all events, these can be unnecessary and detrimental to predictive capabilities. Thus, the proposed privacy indicators allow control over this tradeoff.

In some cases, the privacy indicators can be computed in a similar manner as that of the severity indicators, e.g., using automated methods such as machine learning models combined with manual judgment. In particular, severity may be correlated with privacy impact, although these do not need to be identical.

Any suitable range of values may be used for the severity and privacy indicators. For example, in the simplest implementation, these indicators may take on binary values (e.g., a value of '1' indicates that the issue has privacy implications for the organization and a value of '0' does not, etc.). In further cases, such values may be on a predefined scale, such as a range of 0-5, 1-10, or any other suitable range to express the degree of severity or privacy sensitivity of an issue detected by issue detector 412.

The remaining components of cloud service 302 described below may operate in conjunction to assess a given issue that is or was present in the network of one organization, and determine whether the same issue is likely to occur in the networks of one or more other organizations. In particular, this functionality checks for similarities between the precursor signs or configurations of the devices in the network of the first entity that lead up to the performance issue, and then analyzes this information in the networks of other organizations, to determine whether the same issue is likely to occur there, as well. These components can either check each target organization (e.g., when issue detector 412 detects a new issue), or can monitor the various organizations regularly.

As shown, further potential components of cloud service 302 include an entity mapper 408 and relevance evaluator 410, in some embodiments. Note that a given issue will be associated with portions of one or more time series from time series extractor 406 and for one or more network devices/entities 402. For example, the issue may be exhibited by a particular AP, radio, and/or wireless client. Generally, entity mapper 408 and relevance evaluator 410 may be responsible for short-listing entities with similar characteristics in the network(s) of one or more other organizations.

Operation of entity mapper 408 may proceed as follows: for each entity 402 in a network under assessment, entity mapper 408 may extract out their characteristics. For example, characteristics of an AP entity 402 may include the make, model, OS version, data regarding the typical distribution of client or throughput load, side characteristics such as information about the wireless controller managing the AP (e.g., the load characteristics of the controller, the version or configuration of the controller, etc.), or any other characteristics that can be obtained regarding an AP or other entity 402. In turn, entity mapper 408 may generate a short list of other entities 402, typically located in networks of other organizations, which have characteristics that closely match that of the reference entity 402. For example, entity mapper 408 may assess the characteristics of a network entity 402*n*, to determine whether the characteristics closely match that of network entity 402*a* located in a different network and operated by a different organization.

The mapping of entity characteristics by entity mapper 408 can be performed in a 1:1 manner, where each entity that exhibits an issue detected by issue detector 412 gets a short-list of matching entities 402 in the target organization or network. However, this is not ideal for issues that involve a large amount of entities 402 (e.g., many clients, etc.). Instead, in further embodiments, entity mapper 408 may perform the entity mapping in the aggregate where a list of matching entities in the target organization/network is constructed directly for each entity type.

Relevance evaluator 410 may operate in conjunction with entity mapper 408, to jointly determine how well the characteristics match of the entities 402 assessed by entity mapper 408. Doing so helps prevent against replaying an event to the "closest looking entity" in the target organization, if it is still very different from the entity 402 that exhibited the performance issue. The relevance evaluation by relevance evaluator 410 may provide an overall score, which can be used to weight the relevance of the overall issue replay procedure. When the relevance is low, the result may never be displayed to the target organization (e.g., by preventing its inclusion in visualization data 416). The relevance can also be used by the reporting orchestrator 414 described below, to effect a trade off as to whether the issue replay results are worth displaying to a user associated with the target organization. In some cases, explicit feedback 418 can also be used to tune the relevancy scores from relevancy evaluator 410, such as an explicit indication from a user that the compared entities are not actually comparable or otherwise similar.

Using the mapped characteristics of the monitored entities 402 from entity mapper 408 and the relevancy scores from relevancy evaluator 410, issue detector 412 may determine a likelihood of the issue being present or arising in the other network/organization. In particular, there are two possible types of conditions that issue detector 412 may detect:

1.) Situations that, by themselves, could lead to issues. For example, a misconfigured network entity 402 or an unstable wireless environment that could lead to performance issues at any time, based on the input traffic.

2.) Situations and action combinations that could lead to issues. For example, a certain specific configuration and network element hardware type might have been observed to fail in a first network/organization when the controller is updated to a specific software version. Warning the operator of another network/organization that an upgrade could lead to issues allows the operator to avoid potentially risky or unstable situations in the first place.

For each relevant entity in the target organization's network (e.g., as determined by entity mapper 408 and/or relevance evaluator 410), issue detector 412 may compare the time series of the entity 402 exhibiting the issue to that or those of the one or more other entities 402 deemed on the short-list for the entity and located in other networks/organizations. By doing so, issue detector 412 can identify when an entity 402 in another target network/organization is exhibiting similar patterns in its own time series (e.g., by maintaining a database of issues and portions of characteristic time series associated with the issues). In turn, issue detector 412 may generate an alert for a user of the other organization (e.g., via visualization data 416). Depending on which time series match, and the nature of the original issue, the detection may fall into either of the categories above.

Figure 6:
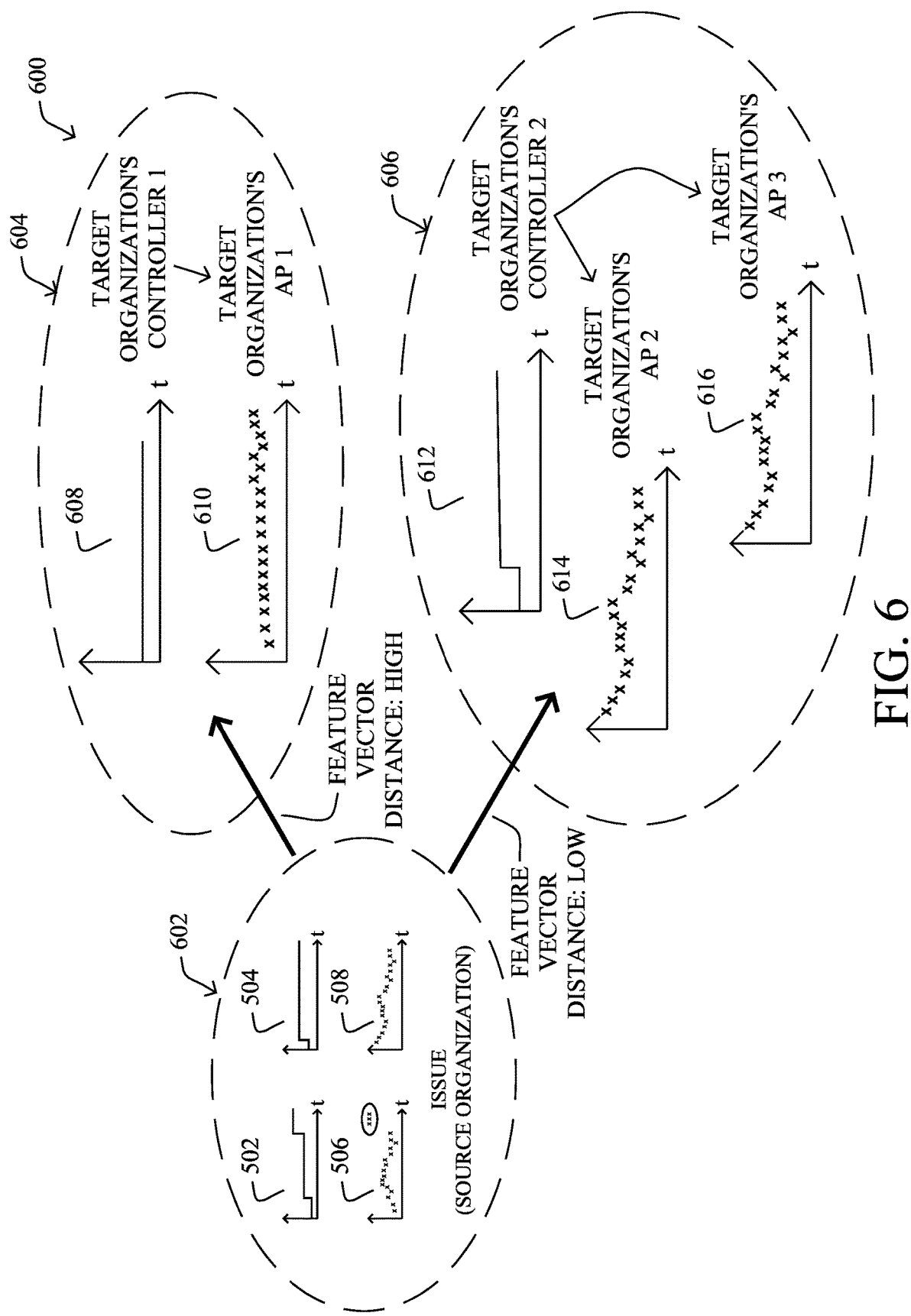
FIG. 6 illustrates an example of identifying the likelihood of an issue across organizations.

Referring briefly to FIG. 6, an example 600 is shown of identifying the likelihood of an issue across organizations, according to various embodiments. As shown, assume that information about a first network/organization 602 includes the time series 502-508 from FIGS. 5A-5D that are associated with a detected issue 510 (e.g., are temporally related to the portion of time series 506 surrounding the anomalous behavior exhibited by the access point). In such a case, the cloud service may identify the short-list of entities/devices present in the network of another, target organization for which the characteristics of the entities in the first network 602 can be mapped. These may include, for example, a set 604 of a wireless controller-AP pair in the target network (e.g., controller 1 and AP 1), and/or a set 606 that includes a second wireless controller and the two APs that it supervises (e.g., controller 2 and APs 2-3). For example, the controllers and APs between the two networks/organizations may be of the same or similar make, OS, setup, traffic profiles, etc.

Once the cloud service has identified good candidates for comparison, issue detector 412 may compare the time series surrounding the detected issue to those of the other candidate entities in the other network/organization. For example, as shown, issue detector 412 may compare the version time series 502 for the controller in network 602 to the version time series 608 and version time series 612 of the controllers in the second network/organization. Associated with the controller version time series may be the corresponding metrics time series 508, 610, 614, and 616, for their corresponding APs, respectively.

To identify the likelihood of the issue occurring in the second network/organization, the cloud service may compute the feature vector distance(s) between the evaluated time series. For example, in the case of the first controller of the target organization, time series 608 may indicate that the OS of the controller has not received the first update, in contrast to time series 502, which indicates that the issue arose after applying both available updates to that controller. Thus, the feature vector distance(s) can be used as a measure of the likelihood of the issue re-occurring in the target network/organization. In contrast, now consider time series 612, which indicates that the second controller of the organization has already been updated once. In this situation, the feature vector distance between time series 502 and 612 may be very low, indicating a much higher likelihood of the same issue recurring, should the second controller be updated again (e.g., to version 2.0.0).

Referring again to FIG. 4, cloud service 302 may also include a reporting orchestrator 414 that orchestrates which issues are actually indicated in visualization data 416 to a user of the target organization. In general, this component may use the privacy indicators for the issues detected by issue detector 412 to control which potential issues are actually displayed to the target organization. In another embodiment, reporting orchestrator 414 may use reinforcement learning, to further control which potential issues are reported. For example, the user may provide explicit feedback 418 to the cloud service 302 regarding whether he or she considers a presented potential issue as something he or she would like to see in the future. In turn, reporting orchestrator 414 may use this feedback to suppress the reporting of similar issues that may arise. Orchestrator 414 can also reuse the feature vectors built by the entity matching and issue detection mechanisms, to represent issues and entities in visualization data 416 and/or report to other systems, for further review.

Figure 7:
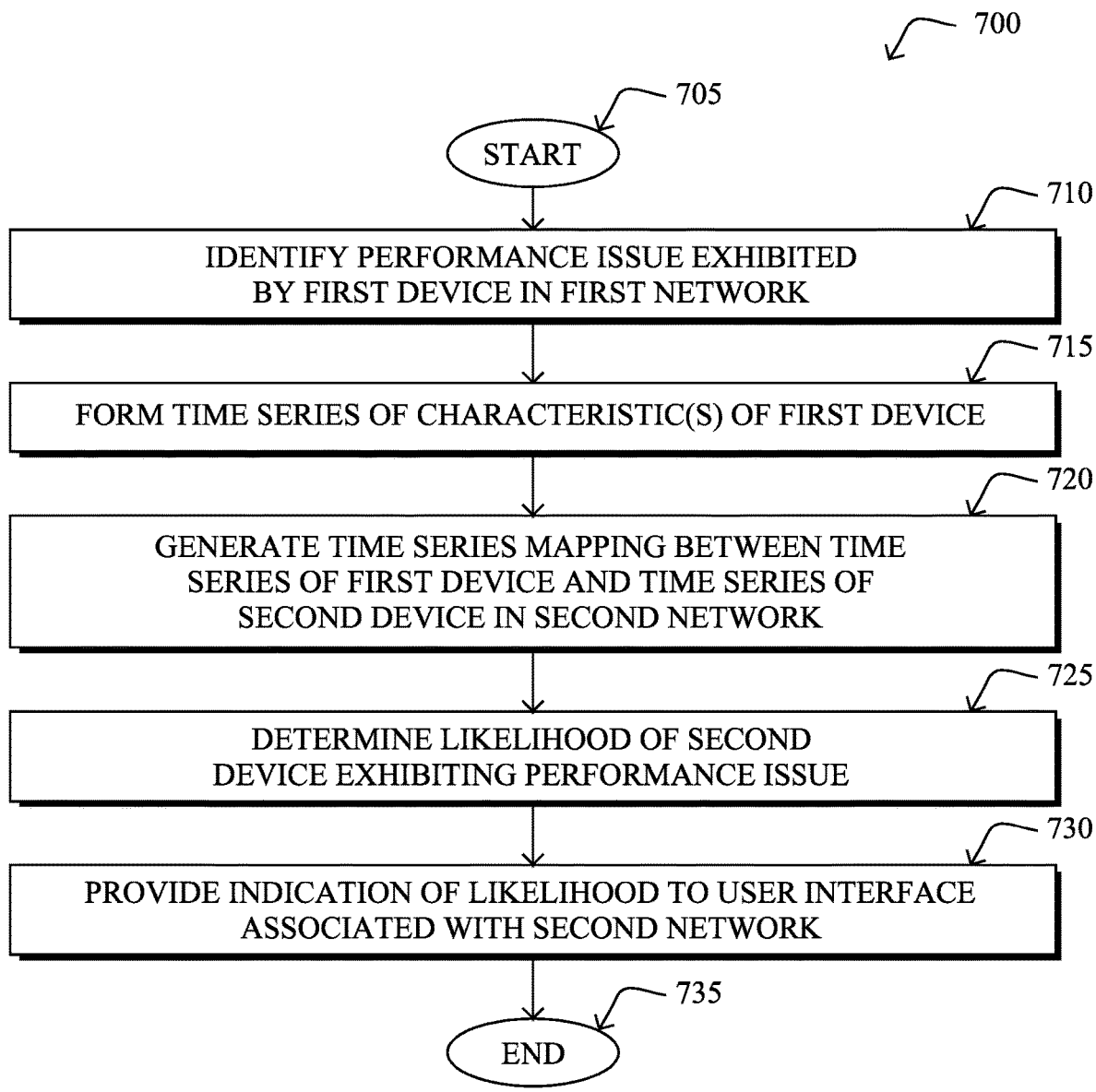
FIG. 7 illustrates an example simplified procedure for providing an indication of a potential performance issue to a user interface.

FIG. 7 illustrates an example simplified procedure for providing an indication of a potential performance issue to a user interface, in accordance with one or more embodiments described herein. For example, a non-generic, specifically configured device (e.g., device 200) may perform procedure 700 by executing stored instructions (e.g., process 248), to implement a network assurance service. The procedure 700 may start at step 705, and continues to step 710, where, as described in greater detail above, the service may identify a performance issue exhibited by a first device in a first network. In various embodiments, the service may identify the performance issue by performing anomaly detection on one or more characteristics of the first device or based on explicit feedback from a user interface (e.g., a user associated with the first network reports the issue).

At step 715, as detailed above, the service may form a set of one or more time series of one or more characteristics of the first device associated with the identified performance issue. In other words, the service may track any or all of the characteristics of the first device over time. Such characteristics may include, but are not limited to, the make, model, software or OS version, etc. of the device. In further cases, the characteristics may include any measurements with respect to the device, such as client load, throughput, bandwidth usage, or the like. In yet additional cases, the characteristics may also include one or more characteristics of devices that may be connected to the first device. For example, if the first device is an AP, its characteristics may also include any characteristics available for its supervisory controller, or vice versa.

At step 720, the service may generate a mapping between the set of one or more time series of one or more characteristics of the first device to one or more time series of one or more characteristics of a second device in a second network, as described in greater detail above. In some embodiments, the mapping may comprise a relevancy score that quantifies a degree of similarity between the characteristics of the first and second devices. For example, the service may attempt to identify a second device in another network that has similar characteristic types as that of the first device that exhibited the performance issue (e.g., another device of the same make, model, configuration, etc.).

At step 725, as detailed above, the service may determine a likelihood of the second device exhibiting the performance issue exhibited by the first device based on the generated mapping and on the relevancy score for the mapping. For example, in some cases, the service may compute a feature vector distance between feature vectors derived from the time series of device characteristics for the two devices. Such a feature vector distance may be used to determine how likely the performance issue experienced by the first device is to occur in the second device. Notably, if the feature vector distance is low, this may indicate that the second device is exhibiting many of the same conditions that led up to the performance issue in the first device.

At step 730, the service may provide an indication of the determined likelihood of the second device exhibiting the performance issue to a user interface associated with the second network. For example, assuming that the privacy indicators for the issue are such that sharing of this information is allowed, the service may send an alert or warning to a user associated with the second network, to notify him or her that the same issue experienced by the first device in the first network are likely to exhibit in the second device, and under which conditions (e.g., based on the compared characteristics over time). Procedure 700 then ends at step 735.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, help to anticipate issues that may occur across different networks of different organizations. Sharing performance issues across different organizations is a radically different approach than addressing each issue locally, allowing organizations to proactively correct issues that other organizations with similar networks have observed or gone through. Further, the techniques herein also enact a number of privacy measures, to ensure that sensitive information about the network that experienced the issue are not shared with the other organizations.

While there have been shown and described illustrative embodiments that provide for cross-organizational network diagnostics with privacy awareness, it is to be understood that various other adaptations and modifications may be made within the spirit and scope of the embodiments herein. For example, while certain embodiments are described herein with respect to using certain machine learning approaches, these approaches are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   identifying, by a service, a performance issue exhibited by a first device in a first network;
   forming, by the service, a set of one or more time series of one or more characteristics of the first device associated with the identified performance issue;
   generating, by the service, a mapping between the set of one or more time series of one or more characteristics of the first device to one or more time series of one or more characteristics of a second device in a second network, wherein the mapping comprises a relevancy score that quantifies a degree of similarity between the characteristics of the first and second devices, wherein the characteristics are indicative of one or more of: hardware information, software information, or network topology information associated with the first and second devices;
   determining, by the service, a likelihood of the second device exhibiting the performance issue exhibited by the first device based on the generated mapping and on the relevancy score for the mapping; and
   providing, by the service, an indication of the determined likelihood of the second device exhibiting the performance issue to a user interface associated with the second network.

2. The method as in claim 1, wherein the one or more characteristics of the first and second devices comprise at least one of: a model, operating system (OS) version, typical client load, or throughput load of the first and second devices.

3. The method as in claim 1, wherein identifying the performance issue exhibited by a first device in a first network comprises:
   applying, by the service, a machine learning-based anomaly detector to the one or more characteristics of the first device, to detect the performance issue.

4. The method as in claim 1, wherein identifying the performance issue exhibited by a first device in a first network comprises:
   receiving, at the service, an indication of the performance issue from a user interface.

5. The method as in claim 1, further comprising:
   receiving, at the service, feedback from the user interface regarding the provided indication of the determined likelihood of the second device exhibiting the performance issue; and
   using, by the service, reinforcement learning on the feedback, to adjust when indications are provided to the user interface of devices in the second network potentially exhibiting performance issues.

6. The method as in claim 1, wherein determining the likelihood of the second device exhibiting the performance issue exhibited by the first device based on the generated mapping and on the relevancy score for the mapping comprises:
   generating one or more feature vectors based on the one or more time series of characteristics of the first device in the first network;
   generating one or more feature vectors based on the one or more time series of characteristics of the second device in the second network; and
   determining a feature vector distance between the feature vectors for the first and second devices, wherein the relevancy score is based on the determined feature vector distance.

7. The method as in claim 1, wherein the second device is a wireless access point in the second network, and wherein the one or more characteristics of the second device comprises a characteristic of a wireless controller that controls the second device.

8. The method as in claim 1, further comprising:
   anonymizing, by the service, the one or more characteristics of the first device.

9. The method as in claim 8, further comprising:
   determining, by the service, a privacy indicator for the performance issue indicative of whether an organization associated with the first network would be identifiable from the performance issue.

10. The method as in claim 9, wherein anonymizing the characteristics of the first and second devices used to form the time series comprises:
    altering, by the service, a period of time associated with the one or more time series for the first device or the one or more characteristics of the first device.

11. An apparatus comprising:
    one or more network interfaces to communicate with a network;
    a processor coupled to the network interfaces and configured to execute one or more processes; and
    a memory configured to store a process executable by the processor, the process when executed configured to:
    identify a performance issue exhibited by a first device in a first network;
    form a set of one or more time series of one or more characteristics of the first device associated with the identified performance issue;
    generate a mapping between the set of one or more time series of one or more characteristics of the first device to one or more time series of one or more characteristics of a second device in a second network, wherein the mapping comprises a relevancy score that quantifies a degree of similarity between the characteristics of the first and second devices, wherein the characteristics are indicative of one or more of: hardware information, software information, or network topology information associated with the first and second devices;
    determine a likelihood of the second device exhibiting the performance issue exhibited by the first device based on the generated mapping and on the relevancy score for the mapping; and
    provide an indication of the determined likelihood of the second device exhibiting the performance issue to a user interface associated with the second network.

12. The apparatus as in claim 11, wherein the one or more characteristics of the first and second devices comprise at least one of: a model, operating system (OS) version, typical client load, or throughput load of the first and second devices.

13. The apparatus as in claim 11, wherein the apparatus identifies the performance issue exhibited by a first device in a first network by:
  applying a machine learning-based anomaly detector to the one or more characteristics of the first device, to detect the performance issue.

14. The apparatus as in claim 11, wherein the apparatus identifies the performance issue exhibited by a first device in a first network by:
  receiving an indication of the performance issue from a user interface.

15. The apparatus as in claim 11, wherein the process when executed is further configured to:
  receive feedback from the user interface regarding the provided indication of the determined likelihood of the second device exhibiting the performance issue; and
  use reinforcement learning on the feedback, to adjust when indications are provided to the user interface of devices in the second network potentially exhibiting performance issues.

16. The apparatus as in claim 11, wherein the apparatus determines the likelihood of the second device exhibiting the performance issue exhibited by the first device based on the generated mapping and on the relevancy score for the mapping by:
  generating one or more feature vectors based on the one or more time series of characteristics of the first device in the first network;
  generating one or more feature vectors based on the one or more time series of characteristics of the second device in the second network; and
  determining a feature vector distance between the feature vectors for the first and second devices, wherein the relevancy score is based on the determined feature vector distance.

17. The apparatus as in claim 11, wherein the second device is a wireless access point in the second network, and wherein the one or more characteristics of the second device comprises a characteristic of a wireless controller that controls the second device.

18. The apparatus as in claim 11, wherein the process when executed is further configured to:
  anonymize the one or more characteristics of the first device; and
  determine a privacy indicator for the performance issue indicative of whether an organization associated with the first network would be identifiable from the performance issue.

19. The apparatus as in claim 18, wherein the apparatus anonymizes the characteristics of the first and second devices used to form the time series by:
  altering a period of time associated with the one or more time series for the first device or the one or more characteristics of the first device.

20. A tangible, non-transitory, computer-readable medium storing program instructions that cause a server to execute a process comprising:
  identifying a performance issue exhibited by a first device in a first network;
  forming a set of one or more time series of one or more characteristics of the first device associated with the identified performance issue;
  generating a mapping between the set of one or more time series of one or more characteristics of the first device to one or more time series of one or more characteristics of a second device in a second network, wherein the mapping comprises a relevancy score that quantifies a degree of similarity between the characteristics of the first and second devices, wherein the characteristics are indicative of one or more of: hardware information, software information, or network topology information associated with the first and second devices;
  determining a likelihood of the second device exhibiting the performance issue exhibited by the first device based on the generated mapping and on the relevancy score for the mapping; and
  providing an indication of the determined likelihood of the second device exhibiting the performance issue to a user interface associated with the second network.

* * * * *